June 12, 1962        H. H. GANSZ        3,038,375
SPECTACLE FLOAT
Filed July 21, 1958
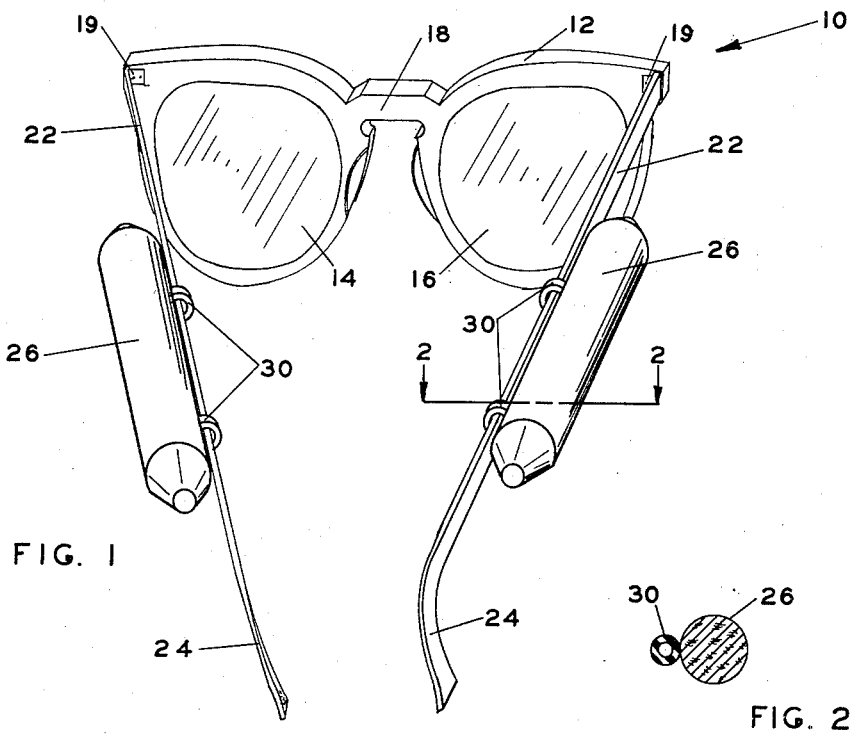
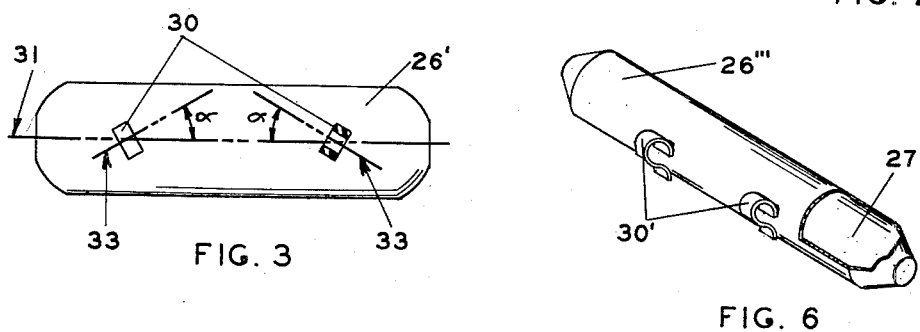
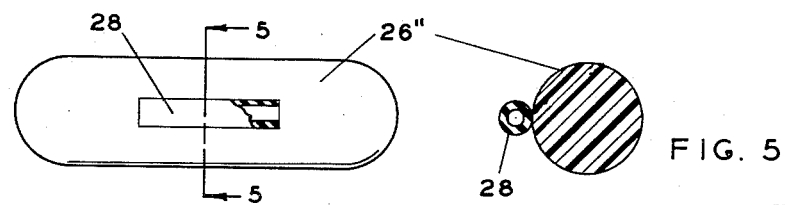
*INVENTOR:*
HARRY H. GANSZ
BY James R. Head
ATTORNEY 3,038,375
SPECTACLE FLOAT
Harry H. Gansz, Tulsa, Okla., assignor to Optic-Glass Float Company, Tulsa, Okla., a corporation of Oklahoma
Filed July 21, 1958, Ser. No. 749,918
1 Claim. (Cl. 88—41)

This invention relates to apparatus for floating objects in liquids. More particularly, it relates to a float or floats for preventing articles such as spectacles, or eye glasses from falling to the bottom of a liquid body such as a lake or river.

Briefly, this invention concerns a low density float material which is attached to the frame members of spectacles or eye glasses.

The principal object of this invention is to overcome the problem of losing spectacles or eye glasses which may accidentally drop into the water while engaging in various water sporting activities. This includes fishing, boating, skiing and the like.

It is a further object of this invention to disclose apparatus which will float spectacles or eye glasses when accidentally dropped into the water.

It is a further object of this invention to disclose a method of recovering accidentally dropped spectacles.

It is still a further object of this invention to disclose a float apparatus for spectacles and eye glasses which is light-weight and not bothersome to the wearer.

Additional objects and a better understanding of my invention may be had by referring to the following description and claim, taken in conjunction with the accompanying drawings in which:

FIG. 1 is a typical application of the apparatus of this invention;

FIG. 2 is a sectional view taken along line 2—2 of FIG. 1;

FIG. 3 represents an additional embodiment as to a specific design of clamping means;

FIG. 4 represents a typical float comprising a still further design of clamping means;

FIG. 5 is a sectional view taken along the line 5—5 of FIG. 4;

FIG. 6 represents a hollow tubular style float for use according to this invention.

Description

Referring now to FIGS. 1 and 2, a typical application of this invention is illustrated. Spectacles or eye glasses 10, are similar to those commonly worn by individuals to correct vision by using special forms of ground lens, or to protect the eyes, using polarizing or colored lens. The spectacle typically comprises the lens frame 12, connecting two lens members 14 and 16 by a nose-bridge piece 18. Hinged at 19 to this frame member at the outer extremities are two temple and ear pieces 22 and 24. The temple portion 22 is relatively straight, while the ear portion 24 is curved to fit the back part of the ear next to the head, and hold the frame upon the head of the wearer.

Float members 26, of this invention, are attached to each temple portion. It is within the purview of this invention that one or more float members be attached to the lens frame section 12. The floats are attached to the temples by means of resilient bands 30. These attaching type bands are composed of high quality, high strength, gum rubber and are approximately ⅛ inch in length. The bands are rigidly affixed to the float members 26, as by brading, staples and adhesives, in such manner that the temple and ear piece may pass through the tubular portion of the band without excess restriction. Preferably, the bands have an internal diameter slightly smaller than the largest dimension of the eye piece along the temple portion. This will prevent movement of the float while wearing.

An additional embodiment involving the clamping bands is described in FIG. 3. Bands 30 are affixed to the float 26 along a line 31, which is parallel to the longitudinal axis of the float. However, the bands are attached in such manner that their central or principal axes 33 are not parallel to the longitudinal axis of the float, but form the angle α. In the preferred embodiment, α is measured from the line 31 between the bands 30 to the central axes of each band and is less than 90° but not less than about 15° or 10°. Placement of the bands 30 at an angle facilitates the clamping of the float to the temple portion, by frictional contact and also facilitates attachment and removal from the ear piece section.

FIGS. 4 and 5 describe another form of clamping apparatus when used with float 26″. This form of clamp comprises a single, cylindrical tube 28 of resilient or elastic material rigidly affixed to the float 26 leaving the tubular conduit open for passage of the spectacle ear piece and temple members 22 and 24.

FIG. 6 represents an additional embodiment of this invention. The float member 26‴ comprises a hollow tubular element closed and sealed to form an air or gas chamber 27 as seen by the cut-away portion. Experiments indicate that a gas volume of 1.5 cubic inches to about 3.0 cubic inches is sufficient to float ordinary spectacles. This style of float will have the elastic band type attachment elements 30 as heretofore described, or a metallic clip style 30′ for clamping to the temple portions. The metallic clip style is also adaptable to the low density floats as defined and described in the drawings and specifications.

Materials and Construction

The floats described according to this invention may be constructed from such materials as expanded thermo-setting and thermoplastic resins, such as polystyrene, an expanded plastic-like material used under the trademark designation Styrofoam. Additional plastics or synthetic resins include expanded cellulose acetate type materials and expanded ureaformaldehyde resins. The latter type of light weight material is made from urea-formaldehyde resin frothed with the aid of frothing material and set by a curing agent after it is poured into the desired shape. Other materials adaptable to this invention include a cellular expanded hard rubber material, protein-base sponge, cellular forms of glass and low density woods, such as balsa wood and cork. Other low density materials having a total density calculated from their weight and dimensional measurements within the range of 0.02 to about 0.35 gram per cubic centimeter are inclusive of this invention. In particular, I have found that hard balsa having density range from 0.16 to about 0.32 gram per cubic centimeter, to be particularly effective as a spectacle float.

The particular shape of the float will depend to a great extent upon the type of material used. I have found in particular that a cylindrical shape is most desirable. In particular, a balsa float similar to that shown at 26 of FIG. 1 was constructed about 3½ inches in length and ½ to ¾ inch in diameter. It was found sufficient to float even the heaviest types of spectacle and eye glasses. A streamline shape has been found best to prevent wind drag when attached to the temple portion. When using materials of lower density, or the hollow style as shown in FIG. 6, a smaller diameter member may be used. The size and shape is not unduly bothersome as to weight or sight to the wearer. The floats are painted or coated with a bright color, clearly visible in the water from a distance.

The float may be formed from existing material stocks and sizes of low density materials or may be formed on a lathe, or molded, extruded, or cast into the desired shape.

The apparatus for retaining the float upon the eye glasses may comprise a metallic snap or clip-on style or preferably a resilient band-type as described. It is preferable to use at least one resilient band-type having an outer diameter within the range of ¼ to ⅜ inch with an internal diameter of about 3/16 to ¼ inch. The band is approximately 1/16 to ⅛ inch in length or width. As shown in FIG. 1, two of these bands are attached to the float member by staples, nails, adhesives, or any of the other well known attaching means to those skilled in the art. Attachment is made along a line of the float parallel to the center axis, so as to leave the inner diameter open and away from the float for attachment by inserting the eye pieces through the respective bands. The float will rest normally outside the temple portion without distraction to the wearer.

Inclusive of this invention is a single band which encompasses the float and temple portion. Small grooves in the float prevent movement of the band after attachment.

The float material being of light weight and normally soft, is also adaptable in its use to attachment of artificial fishing lures thereto, without creating excess weight to the eye glasses.

Although I have described my invention with a certain degree of particularity, it is understood that the present disclosure has been made only by way of example and that numerous changes in the details of construction, combination and arrangement of parts may be resorted to without departing from the spirit and the scope of the invention as hereinafter claimed.

I claim:

A float for attachment to the straight portion of the temple and curved ear members of spectacles, comprising,
an elongated and substantially cylindrical gas filled float,
two spaced resilient rings substantially affixed to the periphery of said float along a line parallel to the elongated axis of said member,
the cylindrical axes of said rings being inclined at an angle less than 90° but greater than about 10° to said line such that said axes intersects at a point between the said rings,
said rings capable of being twisted and stretched about said affixed point over said curved ear to a position on said straight portion whereby said rings have assumed a position with their said axes substantially parallel to said line.

References Cited in the file of this patent

UNITED STATES PATENTS

| | | |
|---|---|---|
| 1,999,702 | Lafond et al. | Apr. 30, 1935 |
| 2,561,402 | Nelson | July 24, 1951 |
| 2,626,538 | Frum | Jan. 27, 1953 |
| 2,693,605 | Berlew | Nov. 9, 1954 |
| 2,731,759 | Hornke | Jan. 24, 1956 |

FOREIGN PATENTS

| | | |
|---|---|---|
| 647,864 | Great Britain | Dec. 20, 1950 |
| 829,813 | Germany | Jan. 28, 1952 |